(12) United States Patent
Saito et al.

(10) Patent No.: US 12,552,960 B2
(45) Date of Patent: Feb. 17, 2026

(54) POLYAMIDEIMIDE RESIN COMPOSITION AND METHOD FOR PRODUCING POLYAMIDEIMIDE RESIN

(71) Applicant: Showa Denko Materials Co., Ltd., Tokyo (JP)

(72) Inventors: Yasuyuki Saito, Tokyo (JP); Atsushi Takahashi, Tokyo (JP); Rei Satake, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 880 days.

(21) Appl. No.: 17/610,980

(22) PCT Filed: May 16, 2019

(86) PCT No.: PCT/JP2019/019560
§ 371 (c)(1),
(2) Date: Nov. 12, 2021

(87) PCT Pub. No.: WO2020/230330
PCT Pub. Date: Nov. 19, 2020

(65) Prior Publication Data
US 2022/0228028 A1    Jul. 21, 2022

(51) Int. Cl.
| | | |
|---|---|---|
| C09D 179/08 | (2006.01) | |
| C08G 73/14 | (2006.01) | |
| C08L 79/08 | (2006.01) | |
| C09D 7/63 | (2018.01) | |

(52) U.S. Cl.
CPC .......... *C09D 179/08* (2013.01); *C08G 73/14* (2013.01); *C08L 79/08* (2013.01); *C09D 7/63* (2018.01)

(58) Field of Classification Search
None
See application file for complete search history.

(56) References Cited

U.S. PATENT DOCUMENTS

2017/0363992 A1* 12/2017 Sasaki ................ G03G 15/162
2020/0239686 A1* 7/2020 Takahashi ............... C09D 5/00

FOREIGN PATENT DOCUMENTS

| | | | |
|---|---|---|---|
| CN | 106062107 A | 10/2016 | |
| CN | 107515518 A | 12/2017 | |
| EP | 0 451 738 B1 | 10/1991 | |
| JP | H04-080242 A | 3/1992 | |
| JP | H04-218561 A | 8/1992 | |
| JP | H08-143663 A | 6/1996 | |
| JP | H 08143663 | * 6/1996 | |
| JP | 2012-077249 A | 4/2012 | |
| JP | 2017-517582 A | 6/2017 | |
| JP | 2017-223838 A | 12/2017 | |
| JP | 2018-146795 A | 9/2018 | |
| WO | WO-2015144663 A1 | * 10/2015 | .......... C08G 3/1032 |
| WO | 2018/002988 A1 | 3/2019 | |
| WO | 2017/217293 A1 | 4/2019 | |
| WO | 2018/150566 A1 | 12/2019 | |

OTHER PUBLICATIONS

Machine translation of WO-2015144663 (Year: 2015).*
Machine Translation of Hirata JPH 08143663 (Year: 1996).*

* cited by examiner

*Primary Examiner* — Robert T Butcher
(74) *Attorney, Agent, or Firm* — FITCH, EVEN, TABIN & FLANNERY, LLP

(57) ABSTRACT

A polyamideimide resin composition comprises a polyamideimide resin and a solvent containing a compound represented by formula (1). In the formula, $R^1$ represents an alkyl group of 1 to 8 carbon atoms, $R^2$ and $R^3$ each independently represent a hydrogen atom or an alkyl group of 1 to 8 carbon atoms, and X represents an alkylene group of 1 to 8 carbon atoms.

(1)

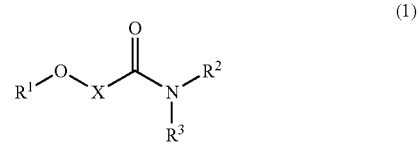

19 Claims, No Drawings

POLYAMIDEIMIDE RESIN COMPOSITION AND METHOD FOR PRODUCING POLYAMIDEIMIDE RESIN

CROSS-REFERENCE TO RELATED APPLICATIONS

This application is a U.S. national phase application filed under 35 U.S.C. § 371 of International Application No. PCT/JP2019/019560, filed May 16, 2019, designating the United States, which is hereby incorporated herein by reference in its entirety.

TECHNICAL FIELD

Embodiments of the present invention relate to a polyamideimide resin composition and a method for producing a polyamideimide resin.

BACKGROUND ART

Polyamideimide resins exhibit excellent heat resistance, chemical resistance, and solvent resistance, and are therefore widely used in a variety of applications. For example, polyamideimide resins having aromatic rings are used to form coating agents for various substrates which may be varnishes for enameled wires, heat-resistant coatings, coatings for sliding members, and the like.

In order to achieve low-temperature curability and improve mechanical strength, an epoxy resin may be added into a coating agent containing a polyamideimide resin (see, for example, Patent Document 1). However, it is difficult to obtain a coating film having satisfactory adhesion even if the conventional coating agent can be cured at a low temperature. Therefore, further improvements are desired.

Conventionally, a polyamideimide resin is typically produced by carrying out a polymerization reaction in a polar solvent such as N-methyl-2 pyrrolidone (NMP) or dimethylacetamide (DMAC). The polar solvent used in the polymerization reaction is also usually used as a solvent included in a coating agent containing a polyamideimide resin, and NMP is preferably used among polar solvents. In recent years, however, the use of NMP has been limited from the viewpoint of environmental regulations, and therefore it is desired for it to be possible to reduce the use of NMP, which is undesirable in environmental regulations, or for polyamideimide resin to be produced without using NMP.

On the other hand, a polyamideimide resin produced by using a polar solvent other than NMP such as DMAC tends to have a lower adhesion of the coating film compared with a polyamideimide resin produced by using NMP. Further, in a conventional method for producing a polyamideimide resin, heating at 120° C. or more is usually required, and as the number-average molecular weight (Mn) of the polyamideimide resin obtained by the polymerization reaction increases, the solubility of the resin decreases and the flowability of the reaction solution deteriorates, and thus enhancing the working efficiency is desired.

PRIOR ART DOCUMENTS

Patent Documents

Patent Document 1: JP 2012-77249

SUMMARY OF INVENTION

Problems to be Solved by the Invention

In view of the above situation, the present disclosure provides a polyamideimide resin composition which can be used as a coating agent capable of forming a coating film having excellent low-temperature curability and excellent adhesion, and which conforms with environmental regulations. In addition, the present disclosure provides a method for efficiently producing a polyamideimide resin included in the polyamideimide resin composition.

Means for Solving the Problems

The present inventors intensively studied polyamideimide resin compositions, and as a result found that a polyamideimide resin can be efficiently produced by using a specific compound having an alkoxy group ($R^1O$—) in the molecule and an amide structure (—$NR^2R^3$) as a solvent in the production of the polyamideimide resin, and that the compound can be suitably used as a solvent included in a polyamideimide resin composition. Embodiments of the present invention relate to the following embodiments. However, the present invention is not limited to the following embodiments, and includes various embodiments.

One embodiment relates to a polyamideimide resin composition comprising a polyamideimide resin and a solvent containing a compound represented by formula (1).

[Chemical formula 1]

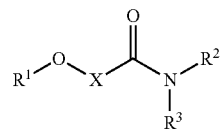

(1)

In the formula, $R^1$ represents an alkyl group of 1 to 8 carbon atoms, $R^2$ and $R^3$ each independently represent a hydrogen atom or an alkyl group of 1 to 8 carbon atoms, and X represents an alkylene group of 1 to 8 carbon atoms.

The polyamideimide resin preferably has a number average molecular weight of 10,000 to 24,000 and has a degree of dispersion of 2.0 to 2.8.

The polyamideimide resin preferably has a terminal group blocked with a blocking agent containing at least one selected from the group consisting of an oxime compound, an alcohol, and a vinyl ether compound.

The compound represented by formula (1) preferably contains at least one selected from the group consisting of 3-methoxy-N,N-dimethylpropionamide and 3-butoxy-N,N-dimethylpropionamide.

The polyamideimide resin composition preferably further contains an epoxy resin.

The polyamideimide resin composition is preferably used as a coating agent for coating a surface of a metal substrate.

A method for producing a polyamideimide resin includes reacting a monomer mixture containing a diisocyanate compound and a tribasic acid anhydride or a tribasic acid halide in a solvent containing a compound represented by formula (1).

[Chemical formula 2]

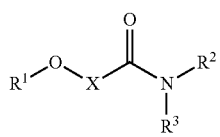

(1)

In the formula, $R^1$ represents an alkyl group of 1 to 8 carbon atoms, $R^2$ and $R^3$ each independently represent a hydrogen atom or an alkyl group of 1 to 8 carbon atoms, and X represents an alkylene group of 1 to 8 carbon atoms.

The reacting is preferably performed at a temperature of 60 to 140° C.

The method preferably further comprises adding a blocking agent to a reaction solution containing a polyamideimide resin obtained by reacting the monomer mixture in the solvent, to block the terminal group of the polyamideimide resin, wherein the blocking agent contains at least one selected from the group consisting of an oxime compound, an alcohol, and a vinyl ether compound.

BRIEF DESCRIPTION OF THE INVENTION

Embodiments of the present invention are described below. However, the present invention is not limited to the following embodiments, but includes various embodiments.
1. Polyamideimide Resin Composition One embodiment relates to a polyamideimide resin composition (hereinafter also referred to as a resin composition) comprising a polyamideimide resin and a solvent containing a compound represented by formula (1). Hereinafter, each component will be specifically described.
(Polyamideimide Resin)

The polyamideimide resin is a resin having an amide bond and an imide bond in a molecular skeleton and can be obtained by reacting a diisocyanate compound and/or a diamine component with an acid component containing a tribasic acid anhydride or a tribasic acid halide.

In one embodiment, the polyamideimide resin may be a resin obtained by reacting a diisocyanate compound with a monomer mixture comprising a tribasic acid anhydride or a tribasic acid halide. A plurality of the above-mentioned resin raw materials (each monomer) used for producing the polyamideimide resin may each be arbitrarily combined and used. The monomer mixture may further contain an optional monomer other than a diisocyanate compound and a tribasic acid anhydride or a tribasic acid halide. The optional monomer may be a compound usable as a resin raw material of the polyamideimide resin. Examples include triisocyanate compounds, diamine compounds, and acid components such as dicarboxylic acid compounds and tetracarboxylic acid anhydrides.

In one embodiment, the polyamideimide resin preferably comprises a structural unit represented by formula (P1).

[Chemical formula 3]

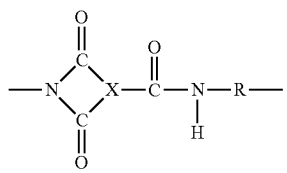

(P1)

In the formula, X represents a residue obtained upon removal of an acid anhydride group and a carboxyl group (acid halide group) from a tribasic acid anhydride (tribasic acid halide). R represents a residue obtained upon removal of isocyanate groups from the diisocyanate compound. When a diamine compound is used, R may be a residue obtained upon removal of amino groups from the diamine compound.

Specific examples of diisocyanate compounds which can be used as resin raw materials include, but are not limited to, 4,4'-diphenylmethane diisocyanate, xylylene diisocyanate, 3,3'-diphenylmethane diisocyanate, 3,3'-dimethyl-4,4'-diisocyanatobiphenyl, paraphenylene diisocyanate, toluene diisocyanate, 1,5 naphthalene diisocyanate, and the like.

An Example of the triisocyanate compound is 1,3,5-triisocyanate-2-methylbenzene.

Examples of the diamine compound include 4,4'-diaminodiphenylmethane, 4,4'-diaminodiphenyl ether, 4,4'-diaminodiphenyl sulfone, 3,3'-diaminodiphenyl sulfone, xylylenediamine, phenylenediamine, and the like.

In one embodiment, a diisocyanate compound is preferably used. From thereamong, 3,3'-dimethyl-4,4'-diisocyanatobiphenyl is preferably used from the viewpoint of improving the elastic modulus. From the viewpoint of cost, 4,4'-diphenylmethane diisocyanate is preferably used.

The tribasic acid anhydride is not particularly limited, but as a specific example, trimellitic acid anhydride is preferably listed. The tribasic acid halide is not particularly limited, but tribasic acid chloride is preferable. Specific examples include trimellitic anhydride chloride (trimellitic anhydride chloride) and the like. From the viewpoint of reducing the load on the environment, trimellitic acid anhydride or the like is preferably used as the acid component.

An acid component other than tribasic acid anhydride (or tribasic acid halide) may be used in combination as the acid component. For example, a saturated or unsaturated polybasic acid such as a dicarboxylic acid compound and a tetracarboxylic dianhydride can be used within a range not impairing the characteristics of the polyamideimide resin. Specific examples of the dicarboxylic acid compound include terephthalic acid, isophthalic acid, adipic acid, and sebacic acid. Specific examples of the tetracarboxylic acid dianhydride include pyromellitic acid dianhydride, benzophenone tetracarboxylic acid dianhydride, and biphenyl tetracarboxylic acid dianhydride. These exemplified compounds may be used alone or may be used in a combination of two or more.

In one embodiment, adipic acid or sebacic acid is preferably used as the acid component from the viewpoint of improving flexibility. From the viewpoint of improving strength, biphenyl tetracarboxylic acid dianhydride is preferably used. In one embodiment, a carboxylic acid component (dicarboxylic acids, tetracarboxylic dianhydrides, etc.) other than tribasic acid anhydride (tribasic acid halide) is preferably used in a total amount of 0 to 30 mol % of the carboxylic acid component with respect to the total acid component from the viewpoint of maintaining the characteristics of the polyamideimide resin.

In one embodiment, the total amount of the diisocyanate compound and the tribasic acid anhydride or tribasic acid halide with respect to the total amount of the monomer mixture to be the resin raw material is preferably 50 mol % or more, more preferably 70 mol % or more, and still more preferably 90 mol % or more. The total amount may be 100 mol %.

The usage ratio of the diisocyanate compound (and diamine compounds) to the acid component, with respect to 1.0 mol of the total amount of the acid component, is preferably 0.8 to 1.1 mol, more preferably 0.95 to 1.08 mol, and more preferably 1.0 to 1.08 mol of the diisocyanate compound (and diamine compounds), from the viewpoints of the molecular weight and degree of crosslinking of the polyamideimide resin produced. Here, the acid component means the total amount of a tribasic acid anhydride or a tribasic acid anhydride halide and other carboxylic acid components (dicarboxylic acids and tetracarboxylic dianhydrides) used as needed.

The conditions for synthesizing the polyamideimide resin are various and cannot be generally specified, but the most representative method for reacting a diisocyanate with a tribasic acid anhydride is exemplified in Japanese Laid-Open Patent Publication No. 4-39323 and the like. A typical method for producing a polyamideimide resin will be described later.

In one embodiment, the polyamideimide resin preferably has a structural unit represented by formula (P2).

[Chemical formula 4]

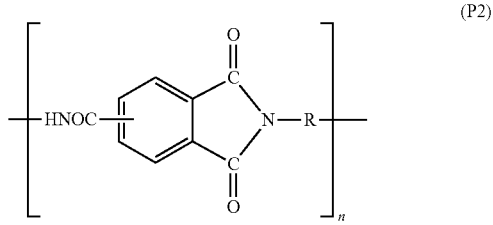

(P2)

In the formula, R represents a residue obtained upon removal of isocyanate groups from a diisocyanate compound. When a diamine compound is used, R may be a residue obtained upon removal of an amino group from the diamine compound. n represents an integer equal to or greater than 1.

The number average molecular weight (Mn) of the polyamideimide resin is preferably 10,000 or more, more preferably 15,000 or more, and still more preferably 17,000 or more, from the viewpoint of the film-forming property. From the viewpoint of workability in the preparation of the coating agent, Mn is preferably 24,000 or less, more preferably 22,000 or less, still more preferably 21,000 or less, and most preferably 20,000 or less. When the Mn is 24,000 or less, turbidity of the reaction solution in the production of the polyamideimide resin can be suppressed, or deposition of granular solids in the reaction solution can be suppressed. Therefore, it is not necessary to re-dissolve the deposited polyamideimide resin after replacing the synthetic solvent with another poor solvent once, and workability and handleability can be improved. From this point of view, in one embodiment, the Mn of the polyamideimide resin is preferably within the range of 10,000 to 24,000.

The Mn of the polyamideimide resin can be adjusted within the above range by sampling the resin at the time of resin synthesis, measuring it with an analytical instrument such as a gel permeation chromatograph (GPC), and continuing the synthesis until the desired Mn value is obtained. When GPC is used, Mn can be measured using a standard polystyrene calibration curve.

In one embodiment, the degree of dispersion (weight average molecular weight/number average molecular weight) of the polyamideimide resin is preferably in the range of 2.0 to 2.8, more preferably in the range of 2.1 to 2.6, and still more preferably in the range of 2.2 to 2.5. When the degree of dispersion of the polyamideimide resin is too small, even if another resin such as an epoxy resin is added to the polyamideimide resin composition, the low temperature curability is poor, and it becomes difficult to obtain excellent adhesion to a metal substrate. When the dispersion degree is too large, the resin composition tends to gel. On the other hand, when the dispersion degree of the polyamideimide resin is 2.0 or more, excellent adhesion to a metal substrate is easily obtained. When the degree of dispersion of the polyamideimide resin is 2.8 or less, the gelation of the resin composition can be easily suppressed, and thus a resin composition suitable for various applications can be efficiently prepared.

From the above viewpoint, in order to form a polyamideimide resin composition suitably usable as a coating agent in one embodiment, it is preferable to use a polyamideimide resin having a number-average molecular weight of 10,000 to 24,000 and having a degree of dispersion of 2.0 to 2.8. As described above, the polyamideimide resin used to form the polyamideimide resin composition preferably satisfies both the number average molecular weight in a specific range and the dispersion degree in a specific range. For example, when the degree of dispersion of the polyamideimide resin is smaller than 2.0 even if the number average molecular weight of the polyamideimide resin is 24,000 or less, obtaining sufficient adhesion to a substrate tends to be difficult, even if an epoxy resin is further blended in the resin composition and these are cured.

When a diisocyanate compound is used as a raw material of a polyamideimide resin, the polyamideimide resin has at its terminal an isocyanate group derived from the diisocyanate compound and/or a carboxyl group derived from an acid component. From the viewpoint of controlling the reactivity, at least one of a terminal carboxyl group and a terminal isocyanate group of the polyamideimide resin is preferably blocked.

In one embodiment, the polyamideimide resin preferably has a blocked terminal isocyanate group and/or a blocked terminal carboxyl group. When the terminal isocyanate group of the polyamideimide resin is blocked, the viscosity increase, turbidity, gelation and the like of the resin composition can be easily suppressed. Therefore, for example, when the resin composition is stored at 40° C. for 45 days and then the change in appearance is observed, problems such as turbidity are not caused and excellent storage stability can be easily obtained. In addition, when the terminal carboxy group of the polyamideimide resin is blocked, an acylation reaction occurs at the time of heat curing, and it becomes easy to suppress a decrease in flexibility and curability. Further, since the polarity of the resin end is changed, it becomes easy to suppress the occurrence of cissing from the substrate and the deterioration of the coating properties when the resin composition is applied to the substrate.

The blocking of terminal groups in the polyamideimide resin can be achieved by using blocking agents known in the art. In one embodiment, an oxime compound or an alcohol is preferably used as the blocking agent for the isocyanate group. A vinyl ether compound is preferably used as the blocking agent for the carboxyl group.

Specific examples of the oxime compound include dimethyl ketone oxime, methyl ethyl ketone oxime, diethyl ketone oxime, methyl butyl ketone oxime, and dibutyl ketone oxime. From thereamong, methyl ethyl ketone oxime is most preferable from the viewpoints of boiling point and reactivity.

The alcohol may be a primary alcohol or a secondary alcohol. Specific examples of the alcohol include methanol, ethanol, propanol, benzyl alcohol, phenol, cresol, and isopropyl alcohol.

Specific examples of the vinyl ether compound include ethyl vinyl ether, butyl vinyl ether, isopropyl vinyl ether, and 2-ethylhexyl vinyl ether. Vinyl ether compounds tend to greatly change the polarity of polyamideimide resins as the aliphatic hydrocarbon chain bonded to the vinyl group is longer. Therefore, it is preferable to select an appropriate compound according to the application of the resin composition. For example, when the resin composition as a coating agent is applied to a metal substrate such as aluminum, butyl vinyl ether, and isopropyl vinyl ether are preferably used.

In the modification (blocking) of the polyamideimide resin with a blocking agent, either a method in which the blocking agent is added as a part of the raw material when the resin is produced or a method in which the blocking agent is added after the resin is produced may be applied. Although not particularly limited, in one embodiment, when the blocking agent is added after the production of the resin, 0.05 to 0.15 mole of the blocking agent is preferably used with respect to 1 mole of the polyamideimide resin.

The glass transition temperature of the polyamideimide resin is preferably 200° C. or more, more preferably 250° C. or more, from the viewpoint of heat resistance.

(Solvent)

The polyamideimide resin composition contains a compound represented by formula (1) as a solvent capable of dissolving or dispersing the polyamideimide resin. The solvent may contain one or more of the compounds represented by the following formula (1). The solvent in the polyamideimide resin composition is sometimes described as a storage solvent in order to distinguish it from a polymerization solvent (described below) used in the production of the polyamideimide resin.

[Chemical formula 5]

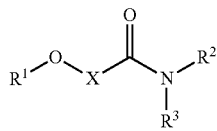

(1)

In the formula, $R^1$ represents an alkyl group of 1 to 8 carbon atoms, $R^2$ and $R^3$ each independently represent a hydrogen atom or an alkyl group of 1 to 8 carbon atoms, and X represents an alkylene group of 1 to 8 carbon atoms.

The alkyl group and the alkylene group may have any of a straight chain structure, a branched structure, and a cyclic structure. In one embodiment, each of the alkyl group and the alkylene group preferably may have a straight chain structure.

$R^1$ may be preferably an alkyl group, and more preferably an alkyl group of 1 to 4 carbon atoms. In one embodiment, $R^1$ may be most preferably methyl or n-butyl.

Each of $R^2$ and $R^3$ independently may be preferably an carbon alkyl group of 1 to 6 carbon atoms, and more preferably an alkyl group of 1 to 4 carbon atoms. In one embodiment, $R^2$ and $R^3$ are most preferably independently methyl or ethyl.

X is preferably an alkylene group of 1 to 6 carbon atoms, and more preferably an alkylene group of 1 to 4 carbon atoms. In one embodiment, the alkylene group of is preferably a linear alkylene group of 2 to 4 carbon atoms.

The compound represented by formula (1) has an alkoxy group ($R^1O-$) and an amide structure ($-NR^2R^3$) in the molecule. The compound having such a structure may be suitably used as a solvent because it has excellent solubility of the polyamideimide resin, a small contact angle with respect to the substrate, and excellent wettability. Further, since the compound has excellent volatility, when the resin composition is used as a coating agent, drying can be conducted without any particular restrictions, and thus excellent curability can be easily obtained. Further, the above compound is preferable from the point of having excellent compliance with environmental regulations as compared with a polar solvent such as NMP conventionally used as a solvent for polyamideimide resin.

In one embodiment, among the compounds represented by the above formula (1) used as the solvent, β-alkoxypropionamide represented by the following formula (1-1) is preferred.

[Chemical formula 6]

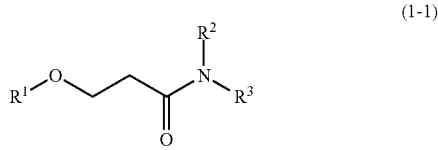

(1-1)

In the formula, $R^1$ represents an alkyl group of 1 to 8, and $R^2$ and $R^3$ each independently represent a hydrogen atom or an alkyl group of 1 to 8 carbon atoms. Preferred embodiments of $R^1$, $R^2$, and $R^3$ are as described above in Formula (1).

Specific examples of β-alkoxypropionamide include 3-methoxy-N,N-dimethylpropionamide, 3-ethoxy-N,N-dimethylpropionamide, 3-n-propoxy-N,N-dimethylpropionamide, 3-isopropoxy-N,N-dimethylpropionamide, 3-butoxy-N,N-dimethylpropionamide, 3-methoxy-N,N-diethylpropionamide, 3-ethoxy-N,N-diethylpropionamide, 3-n-propoxy-N,N-diethylpropionamide, 3-isopropoxy-N,N-diethylpropionamide, and 3-butoxy-N,N-diethyldiethylpropionamide.

In one embodiment, the polyamideimide resin preferably comprises at least one solvent selected from the group consisting of 3-methoxy-N,N-dimethylpropionamide and 3-butoxy-N,N-dimethylpropionamide.

The composition of the solvent in the resin composition is not particularly limited. In one embodiment, the content of the compound represented by formula (1) in the entire solvent may be 100 mass %, and the content of the compound represented by formula (1-1) is more preferably 100 mass %. In this embodiment, the solvent may be preferably 3-methoxy-N,N-dimethylpropionamide, or 3-butoxy-N,N-dimethylpropionamide, or a combination thereof.

In other embodiments, the solvent may optionally include a solvent other than a compound represented by formula (1). When a solvent other than the above compound is contained, the content thereof is preferably 40 mass % or less, more preferably 30 mass % or less, and still more preferably 20 mass % or less, with respect to the entire solvent. When other solvents are used in combination, by adjusting the compounding amount within the above range, it becomes easy to maintain the effect of the compound represented by formula (1) such as the improvement in wettability.

Specific examples of the above other solvents include, but are not limited to, polar solvents such as N-methyl-2-pyrrolidone, N,N'-dimethylformamide, 1,3-dimethylimidazolidinone, 4-morpholine carbaldehyde, and the like; aromatic hydrocarbons such as xylene and toluene; ketones such as methyl ethyl ketone, methyl isobutyl ketone, γ-butyrolactone, and δ-valerolactone; and the like.

The amount of the solvent in the resin composition is not particularly limited, and may be adjusted according to the purpose of use. For example, in the case of a coating agent, the resin concentration may be adjusted by diluting the coating agent with a solvent so as to obtain an appropriate viscosity according to a coating method. In one embodiment, with respect to 100 parts by mass of the polyamideimide resin, the amount of solvent used may be preferably 80 to 200 parts by mass, and more preferably 100 to 150 parts by mass.

The solvent (storage solvent) in the resin composition contains a compound represented by formula (1). In one embodiment, the resin composition may directly contain the polymerization solvent used in the production of the polyamideimide resin. That is, as one embodiment, when a compound represented by formula (1) is used as a polymerization solvent in the production of a polyamideimide resin, the polyamideimide resin composition can be formed with the reaction solution as it is. Alternatively, another solvent may be added to the reaction solution as necessary to form a polyamideimide resin composition. As will be described later, these embodiments are preferable in that a polyamideimide resin having a desired Mn and a desired degree of dispersion can be easily obtained in the production of the resin, and also in that work efficiency is excellent.

In another embodiment, when a solvent other than the compound represented by formula (1) is used as a polymerization solvent in the production of the polyamideimide resin, the compound represented by formula (1) can be added to the reaction solution as a storage solvent to form the polyamideimide resin composition. Alternatively, a polyamideimide resin composition can be formed by adding a compound represented by formula (1) as a storage solvent to a solution (concentrated reaction solution) obtained by removing at least a part of a polymerization solvent in the reaction solution.

(Curing Agent)

In one embodiment, the polyamideimide resin composition may contain the polyamideimide resin, a solvent, and a curing agent. The curing agent is not particularly limited, and at least one selected from the group consisting of an epoxy resin, a phenol resin, a melamine resin, and a blocked isocyanate may be used. In one embodiment, the polyamideimide resin preferably comprises a polyamideimide resin, a solvent, and an epoxy resin. By compounding the resin composition with an epoxy resin, the thermal properties, mechanical properties, and electrical properties of the polyamideimide resin can be more easily improved Examples of the epoxy resin include, but are not limited to, bisphenol A type epoxy resin, bisphenol F type epoxy resin, bisphenol S type epoxy resin, brominated bisphenol A type epoxy resin, biphenyl type epoxy resin, phenol novolac type epoxy resin, cresol novolac type epoxy resin, brominated phenol novolac type epoxy resin, bisphenol A novolac type epoxy resin, naphthalene skeleton-containing epoxy resin, aralkylene skeleton-containing epoxy resin, biphenyl-aralkylene skeleton epoxy resin, phenol salicylaldehyde novolac type epoxy resin, lower alkyl group-substituted phenol salicylaldehyde novolac type epoxy resin, dicyclopentadiene skeleton-containing epoxy resin, glycidylamine type epoxy resin, alicyclic epoxy resin, and the like. These epoxy resins may be used alone or may be used in a combination of two or more.

The epoxy resin may be added alone and reacted with the polyamideimide resin. Alternatively, the epoxy resin may be added together with components such as a curing agent or a curing accelerator for the epoxy resin so that unreacted material of the epoxy resin is less likely to remain after curing.

In one embodiment, when an epoxy resin is blended, the blending ratio is within the range of preferably 1 to 30 parts by mass, and more preferably 3 to 15 parts by mass, with regard to 100 parts by mass of the polyamideimide resin. In addition, the resin composition may contain, separately from the curing agent, a resin component such as a polyethersulfone resin, a polyimide resin, a polyamide resin, or a fluororesin, if necessary. The resin component may be used alone or may be used in a combination of two or more.

The resin composition may further contain any other component depending on the purpose of use. For example, the resin composition can be preferably used as a coating agent. When the resin composition is used as a coating agent, the resin composition may further contain optional components such as pigments, fillers, defoamers, preservatives, lubricants, and surfactants, if necessary.

The resin composition can be used for various applications. For example, it can be used as a coating agent or a coating material such as a heat resistant coating agent, a coating agent for the coating of a sliding part, and the like. It can be preferably used as a binder resin for various protective materials and covering materials, and a binder resin for a fluorine coating agent used for kitchen equipment; as a resin in a film that requires slipperiness; and as a material for a molded article that is molded in a belt shape such as an annular belt used as an intermediate transfer belt in a copying machine. All of these applications are non-adhesive.

As one embodiment, a resin composition containing a polyamideimide resin, a solvent containing a compound represented by the above formula (1), and an epoxy resin can be suitably used as a coating agent. The coating agent contains a specific compound as a solvent, and thus has excellent wettability with respect to a substrate and an excellent film-forming property. The coating film obtained by applying the coating agent to the substrate has an excellent drying property, and also has excellent low-temperature curability and adhesion.

The substrate to which the coating agent can be applied is not particularly limited, but may include, for example, a metal substrate composed of aluminum, stainless steel, iron, copper, and the like. More specifically, it may be a metal substrate made of an aluminum alloy or iron that is mainly used for an automotive sliding member such as an engine piston. Further, the metal substrate may be made of an aluminum alloy or stainless steel that is mainly used for kitchen equipment such as pots, pressure cookers, and frying pans.

In one embodiment, the coating agent may be suitably used to form an insulating coating or a protective coating for, in particular, a metal substrate (hereinafter referred to as aluminum substrate) made of aluminum or an aluminum alloy. Deformation of the aluminum substrate is usually a concern when heat treatment is performed at a high temperature of 250° C. or higher. However, since the coating agent has excellent low-temperature curability, the curing of the coating film sufficiently progresses at a temperature of less than 250° C., about 200 to 230° C. for example, with respect to the aluminum substrate, and excellent adhesion can be obtained.

<Method for Producing Polyamideimide Resin>

In one embodiment, the method for producing a polyamideimide resin includes a step of reacting a monomer mixture containing a diisocyanate compound and a tribasic acid anhydride and/or a tribasic acid halide in a solvent containing a compound represented by formula (1).

The resin raw material used as the monomer mixture in the above manufacturing method is as described in the above polyamideimide resin composition.

The compound represented by formula (1) used as a polymerization solvent is also as described above. The compound can be suitably used as a polymerization solvent of a polyamideimide resin, and the obtained reaction solution can be used as a resin composition in applications such as a coating agent. Among the compounds represented by formula (1), β-alkoxypropionamide represented by formula (1-1) can be suitably used. Specific examples include 3-methoxy-N,N-dimethylpropionamide and 3-butoxy-N,N-dimethylpropionamide. They may be used alone or may be used in combination.

As the polymerization solvent, a compound represented by formula (1) may be used alone or may be mixed with other polar solvents. Examples of polar solvents that can be used in combination include N-methyl-2pyrrolidone, N-formylmorpholine, N-acetylmorpholine, N,N'-dimethylethyleneurea, N,N-dimethylacetamide or N,N-dimethylformamide, and γ-butyrolactone. They may be used alone or may be used in a combination of two or more.

When a compound represented by formula (1) is used as a polymerization solvent, a polyamideimide resin having a number-average molecular weight (Mn) of 10,000 to 24,000 and having a degree of dispersion of 2.0 to 2.8 can easily be obtained. Therefore, when a compound represented by formula (1) is used as a polymerization solvent in the production of a resin composition including a process for producing a polyamideimide resin, a resin composition having the desired characteristics can be efficiently obtained.

On the other hand, when a conventional polar solvent such as NMP or DMAC is used as the polymerization solvent, the degree of dispersion of the obtained polyamideimide resin is about 1.5 to 2.4, and it tends to be difficult to obtain sufficient adhesion when used as a coating agent. In particular, when the number-average molecular weight is less than 16,000, the degree of dispersion tends to be small. When a compound represented by formula (1) is used as a polymerization solvent, a polyamideimide resin having a large degree of dispersion can be obtained even if Mn is small in comparison with a polyamideimide resin obtained by using a conventional polar solvent. The use of such a polyamideimide resin is effective in improving properties such as low temperature curability and adhesion of a coating film, in combination with a resin such as an epoxy resin and an amide resin.

The reaction temperature is not particularly limited, and may be appropriately set depending on the boiling point of the polymerization solvent to be used. For example, the reaction temperature may be within the range of 60 to 140° C. because β-alkoxypropionamide can be suitably used as the polymerization solvent. In one embodiment, when 3-methoxy-N,N-dimethylpropionamide and/or 3-butoxy-N,N-dimethylpropionamide are used, the reaction is preferably performed at a temperature of 60 to 120° C. The reaction temperature is more preferably within the range of 60 to 110° C., and more preferably within the range of 75 to 100° C.

The polymerization reaction is preferably performed in an atmosphere of nitrogen or the like in order to reduce the influence of moisture in the air.

In one embodiment, a catalyst may be used during the reaction. For example, tertiary amines or phosphonic acid-based compounds can be used as the catalyst. These catalysts can be selected according to the reaction temperature at the time of resin production and the purification method. From the viewpoints of separation and purification after the reaction for producing the resin, triethylamine is preferably used as the catalyst.

In one embodiment, the polyamideimide resin can be prepared, for example, by the following procedure.

(1) A method for synthesizing a polyamideimide resin comprises using an acid component and a diisocyanate component and/or a diamine component at the same time and reacting them.

(2) A method for synthesizing a polyamideimide resin comprises reacting an acid component with an excess amount of a diisocyanate component and/or a diamine component to synthesize an amideimide oligomer having an isocyanate group or an amino group at the terminal, and then adding the acid component to react with the isocyanate group and/or the amino group at the terminal.

(3) A method for synthesizing a polyamideimide resin comprises reacting an excess amount of an acid component with a diisocyanate component and/or a diamine component to synthesize an amideimide oligomer having an acid or acid anhydride group at the terminal, and then adding the diisocyanate component and/or the diamine component to react with the acid or acid anhydride group at the terminal.

In one embodiment, the above-mentioned methods may further comprise treating the terminal of the polyamideimide resin with a blocking agent (block process). The available blocking agents are as described above. For example, the blocking of terminal isocyanate groups in a polyamideimide resin may be achieved by using a blocking agent comprising at least one of an oxime compound and an alcohol. The blocking step may be performed under heating or, if necessary, using a catalyst known in the art. Alternatively, the blocking step may be performed in accordance with methods known in the art. However, for example, since the terminal isocyanate group before blocking may self-react, it is preferable to control the resin concentration before blocking or the temperature when the blocking agent is added.

In one embodiment, the method comprises a step (a) of reacting a monomer mixture containing a diisocyanate compound and a tribasic anhydride and/or a tribasic acid halide in a solvent containing a compound represented by formula (1), and a step (b) of adding a blocking agent to the reaction solution obtained in step (a) to block the terminal of a polyamideimide resin. In the blocking step (b), the blocking agent preferably contains one or more selected from the group consisting of an oxime compound, an alcohol, and a vinyl ether compound. For example, when an oxime compound and/or an alcohol is used as the blocking agent, a polyamideimide resin having blocked terminal isocyanate groups can be obtained.

EXAMPLES

Embodiments of the present invention are described in more detail below. The present invention is not limited to the following embodiments.

1. Production of Polyamideimide Resin

The number-average molecular weight (Mn) of the polyamideimide resin manufactured in the examples and comparative examples to be described later is a value obtained by measuring under the following conditions. The degree of dispersion is calculated as a ratio (Mw/Mn) to a weight-average molecular weight (Mw) measured in the same manner as the above-mentioned number-average molecular weight (Mn).

<Measurement Conditions for Number Average Molecular Weight>

GPC apparatus: Hitachi L6000
Detector: Hitachi L 4000 Type UV
Wavelength: 270 nm
Data processing unit: ATT 8
Columns: Gelpack GL-S300MDT-5×2
Column size: 8 mmo×300 mm
Solvent: DMF/THF=1/1 (liter)+0.06 M phosphoric acid+0.06 M lithium bromide
Sample concentration: 5 mg/mL
Injection volume: 5 µL
Pressure: 49 kgf/cm$^2$ (4.8×10$^6$ Pa)
Flow rate: 1.0 mL/min
Column temperature: 40° C.

Example 1

250.3 g (1.00 mole) of 4,4'-diphenylmethane diisocyanate, 192.1 g (1.00 mole) of trimellitic anhydride, and 660 g of 3-methoxy-N, N-dimethylpropionamide (DMPA) were charged into a 2-liter flask. While stirring the charged raw material, the temperature was raised to 100° C. and the temperature was maintained for 7 hours to obtain a solution containing a polyamideimide resin. The polyamideimide resin had a number average molecular weight of 18,900 and had a degree of dispersion of 2.3. To this solution, 8.7 g of methylethylketone oxime was added and reacted at 90° C. for 2 hours to obtain a solution A of a terminally blocked polyamideimide resin.

Example 2

250.3 g (1.00 mole) of 4,4'-diphenylmethane diisocyanate, 192.1 g (1.00 mole) of trimellitic anhydride, and 660 g of 3-methoxy-N,N-dimethylpropionamide (DMPA) were charged into a 2-liter flask. While stirring the charged raw material, the temperature was raised to 100° C. and the temperature was maintained for 7.5 hours to obtain a solution containing a polyamideimide resin. The polyamideimide resin had a number average molecular weight of 19,700 and had a degree of dispersion of 2.4. To this solution, 6.1 g of ethanol and 4.3 g of butyl vinyl ether were added and reacted at 80° C. for 2 hours to obtain a solution B of a polyamideimide resin having blocked ends.

Example 3

150.2 g (0.6 mole) of 4,4-Diphenylmethane diisocyanate, 105.7 g (0.4 mole) of 3,3'-dimethyl-4,4'-diisocyanatobiphenyl, 192.1 g (1.0 mole) of trimellitic anhydride, and 672 g of 3-methoxy-N,N-dimethylpropionamide (DMPA) were charged into 2-liter flask. While stirring the charged raw material, the temperature was raised to 100° C., the temperature was maintained, and the reaction was performed for 7.5 hours to obtain a solution containing a polyamideimide resin. The polyamideimide resin had a number average molecular weight and had a degree of dispersion of 2.2. To this solution 8.7 g of methyl ethyl ketone oxime and 4.3 g of butyl vinyl ether were added and reacted at 80° C. for 2 hours to obtain a solution C of a polyamideimide resin with blocked ends.

Comparative Example 1

250.3 g (1.00 mole) of 4,4'-diphenylmethane diisocyanate, 192.1 g (1.00 mole) of trimellitic anhydride, and 660 g of N-methyl-2-pyrrolidone (NMP) were charged into 2-liter flask. While stirring the charged raw material, the temperature was raised to 125° C. in about 3 hours, and the temperature was maintained and the reaction was performed for 6 hours to obtain a solution D containing a polyamideimide resin. The polyamideimide resin had a number average molecular weight of 18,200 and had a degree of dispersion of 1.8.

Comparative Example 2

250.3 g (1.00 mole) of 4,4'-diphenylmethane diisocyanate, 192.1 g (1.00 mole) of trimellitic anhydride, and 660 g of N-ethyl-2-pyrrolidone (NEP) were charged into 2-liter flask. While stirring the charged raw material, the temperature was raised to 135° C. in about 3 hours, and the temperature was maintained and the reaction was performed for 8 hours to obtain a solution E containing a polyamideimide resin. The polyamideimide resin had a number average molecular weight of 27,900 and had a degree of dispersion of 1.6.

Comparative Example 3

150.2 g (0.6 mole) of 4,4'-diphenylmethane diisocyanate, 69.7 g (0.4 mole) of mixed toluene diisocyanate (Coronate T-60), 192.1 g (1.00 mole) of trimellitic anhydride, and 660 g of γ-butyrolactone GBL) were charged into 2-liter flask. While stirring the charged raw material, the temperature was raised to 135° C. in about 3 hours, and the temperature was maintained and the reaction was performed for 8 hours to obtain a polyamideimide resin solution F. The polyamideimide resin had a number average molecular weight of 24,300 and had a degree of dispersion of 1.6.

Comparative Example 4

250.3 g (1.00 mole) of 4,4'-diphenylmethane diisocyanate, 192.1 g (1.00 mole) of trimellitic anhydride, and 660 g of N,N-dimethylacetamide (DMAC) were charged into 2-liter flask. While stirring the charged raw material, the temperature was raised to 135° C. in about 3 hours, and the temperature was maintained and the reaction was performed for 8 hours to obtain a solution G of a polyamideimide resin. The polyamideimide resin had a number average molecular weight of 23,900 and had a degree of dispersion of 1.6.

<2> Preparation and Evaluation of Coating Agents (Preparation of Coating Agent)

Epoxy resin was added to and mixed with solutions A-G of the resin obtained in Examples 1 to 3 and Comparative Examples 1 to 4, respectively, to prepare a polyamideimide resin composition (coating agent).

The same solvent as the polymerization solvent used in the production of the polyamideimide resin was added, if necessary, so that the content of the polyamideimide resin was 25% by mass with respect to the total mass of the coating agent. In addition, the epoxy resin used for the preparation of the above coating agent was Epomic (registered trade mark) R-140, manufactured by Mitsui Chemicals, Inc., which is a diglycidyl etherate of 2,2-bis (4-hydroxyphenyl) propane with epichlorohydrin, and was added in an amount so that the epoxy resin concentration in the coating agent was about 4 wt % (that is, with respect to 100 parts by mass of the solution containing 25 mass % of the polyamideimide resin, 4.25 parts by mass of the epoxy resin was added).

(Evaluation of the Coating Film)

A coating film was formed by using each of the coating agents prepared previously, and characteristics of the coating film were evaluated as follows.

(1) Adhesion

After each coating agent was applied to the surface of an aluminum substrate (A 1050P, thickness 1 mm, dimensions 50 mm×100 mm, unpolished), the aluminum substrate was put into a dryer and pre-dried at 80° C. for 30 minutes. Then, the aluminum substrate was subjected to heat curing at 230° C. for 30 minutes to form a coating film (test sample A) having a film thickness of 35 μm. As a comparison of the curing temperatures, a coating agent was applied in the same manner as described above, and the coating agent was placed in a dryer and pre-dried at 80° C. for 5 minutes, and then heat-cured at 150° C. for 60 minutes to form a coating film (test sample B) having a film thickness of 35 μm on the aluminum substrate.

The initial adhesion of the coating film to the aluminum substrate of the test samples A and B prepared as described above was evaluated as follows.

(2) Pencil Hardness

Two types of test samples were prepared in the same manner as the test samples A and B that were prepared to evaluate the adhesion, and a pencil hardness test for the coating film was performed in accordance with the pencil scratch test of the old JIS K 5400 standard. The surface of the coating film after the test was visually observed to evaluate the presence of scratches. The pencil hardness at which clear scratches were observed is shown in Table 1.

(3) Bending Test

A test sample was prepared in the same manner as the test sample A that was prepared for evaluating the adhesion, and a bending test was performed. A test sample was wound around a rod having a predetermined diameter, and the coating surface was visually observed to evaluate the presence of cracks. The diameters of the bars with clear cracks are shown in Table 1.

(4) Solvent Resistance (Curability)

After each coating agent was applied to the surface of an iron plate (SPCC-SB, thickness of 0.5 mm, dimensions of 20 mm×50 mm), it was put into a dryer and pre-dried at 80° C. for 30 minutes. Then, it was heated and cured at 150° C. for 60 minutes to form a coating film having a thickness of 15 μm on the iron plate. The test sample thus obtained was set in an ultrasonic cleaner while immersed in N-methylpyrrolidone (NMP) adjusted to a temperature of 20 to 30° C. and left for 1 hour. After 1 hour, the test samples were removed, washed with acetone and dried, and then the mass of the test samples was measured. Next, the coating film residual ratio (%) was calculated from the difference in the mass of the test sample from before and after the immersion, and the curability was evaluated. Table 1 shows the remaining percentages of the coating films.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Components of Coating Agent (Solution of PAI Resin) | | A | B | C | D | E | F | G |
| PAI Resin | Number-average molecular weight (Mn) | 18,900 | 19,700 | 18,300 | 18,200 | 27,900 | 24,300 | 23,900 |
| | Weight-average molecular weight(Mw) | 44,200 | 47,400 | 40,000 | 32,500 | 45,200 | 40,000 | 38,400 |
| | Degree of dispersion (Mw/Mn) | 2.3 | 2.4 | 2.2 | 1.8 | 1.6 | 1.6 | 1.6 |
| Solvent (Polymerization Solvent) | | DMPA | DMPA | DMPA | NMP | NEP | GBL | DMAC |
| Adhesion (%) | Curing temperature 230° C. | 100 | 100 | 100 | 100 | 98 | 88 | 87 |
| | Curing temperature 150° C. | 100 | 100 | 100 | 100 | 65 | 72 | 60 |
| Pencil Hardness | Curing temperature 230° C. | 2H | 2H | 2H | 2H | 2H | 2H | 2H |
| | Curing temperature 150° C. | 2H | 2H | 2H | 2H | 2H | H | H |
| Bending Test | Curing temperature 230° C. | 2 mm | 2 mm | 2 mm | 3 mm | 3 mm | 3 mm | 3 mm |
| Solvent Resistance (Remaining % of Coating Film) | Curing temperature 150° C. | 96 | 92 | 98 | 78 | 71 | 25 | 43 |

Adhesion was measured according to the old JIS K 5400 standard (cross-cut remaining %). That is, a 1×1-mm square grid cut was made in the coating film surface (test surface) by using a cutter knife, and 100 grid patterns were formed. Mending tape #810 (manufactured by 3M Co., Ltd.) was strongly crimped to the grid part, and after slowly peeling the tape, the state of the grid was observed. These peeling tests were performed five times, and the number of residual masses was counted for each peeling test, and the mean value was calculated. Table 1 shows the average of the remaining mass (%) out of the 100 masses.

As can be seen from the results shown in Table 1, when 3-methoxy-N,N-propionamide is used in the production of a polyamideimide resin (Examples 1 to 3), a polyamideimide resin having a smaller Mn and having a greater degree of dispersion than a polyamideimide resin obtained by using a typical conventional polar solvent shown as a comparative example is obtained. Further, by forming the coating agent using the solution of the polyamideimide resin, excellent solvent resistance (hardenability) can be obtained even when low-temperature curing at 150° C. is employed, and excellent coating film characteristics such as adhesion can be obtained as in the case of high-temperature curing at 230° C. (see Examples 1 to 3). On the other hand, in Comparative Examples 2 to 4, the adhesion of the coating film is low, and particularly the adhesion at the time of low-temperature curing is remarkably reduced. The bending property and solvent resistance (curability) of the coating film were inferior to those of Comparative Examples 1 to 4.

The invention claimed is:

1. A polyamideimide resin composition comprising a polyamideimide resin and a solvent consisting of a compound represented by formula (1) and optionally an additional solvent at a content of 40 mass % or less, and wherein the additional solvent is selected from the group consisting of N-methyl-2-pyrrolidone, N,N'-dimethylformamide, 1,3-dimethylimidazolidinone, 4-morpholine carbaldehyde, aromatic hydrocarbons, and ketones,

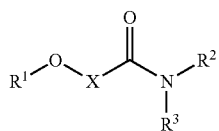
(1)

wherein, in the formula (1), R1 represents an alkyl group of 1 to 8 carbon atoms, R2 and R3 each independently represent a hydrogen atom or an alkyl group of 1 to 8 carbon atoms, and X represents an alkylene group of 1 to 8 carbon atoms,
wherein the polyamideimide resin has a terminal carboxyl group blocked by reaction with a vinyl ether compound,
wherein the polyamideimide resin has a number average molecular weight of 10,000 to 24,000, and
wherein the polyamideimide resin has a degree of dispersion of 2.1 to 2.6, wherein the degree of dispersion is the weight average molecular weight/number average molecular weight.

2. The polyamideimide resin composition according to claim 1, wherein the polyamideimide resin further has a terminal group blocked with a blocking agent containing at least one selected from the group consisting of an oxime compound and an alcohol.

3. The polyamideimide resin composition according to claim 1, wherein the compound represented by formula (1) comprises at least one selected from the group consisting of 3-methoxy-N,N-dimethylpropionamide and 3-butoxy-N,Ndimethylpropionamide.

4. The polyamideimide resin composition according to claim 1, further comprising an epoxy resin.

5. The polyamideimide resin composition according to claim 1, wherein the composition is used as a coating agent for coating a surface of a metal substrate.

6. A method for producing a polyamideimide resin, comprising reacting a monomer mixture containing a diisocyanate compound and a tribasic acid anhydride or a tribasic acid halide, in a solvent consisting of a compound represented by formula (1) and optionally an additional solvent at a content of 40 mass % or less, and wherein the additional solvent is selected from the group consisting of N-methyl-2-pyrrolidone, N,N'-dimethylformamide, 1,3-dimethylimidazolidinone, 4-morpholine carbaldehyde, aromatic hydrocarbons, and ketones,

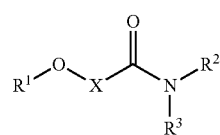
(1)

wherein, in the formula (1), R1 represents an alkyl group of 1 to 8 carbon atoms, R2 and R3 each independently represent a hydrogen atom or an alkyl group of 1 to 8 carbon atoms, and X represents an alkylene group of 1 to 8 carbon atoms;
wherein the polyamideimide resin has a terminal carboxyl group blocked by reaction with a vinyl ether compound, wherein the polyamideimide resin has a number average molecular weight of 10,000 to 24,000, and wherein the polyamideimide resin has a degree of dispersion of 2.1 to 2.6, wherein the degree of dispersion is the weight average molecular weight/number average molecular weight.

7. The method for producing a polyamideimide resin according to claim 6, wherein the vinyl ether compound is added to the monomer mixture in the solvent or the vinyl ether compound is added to a reaction solution containing a polyamideimide resin obtained by reacting the monomer mixture in the solvent, to block a terminal group of the polyamideimide resin.

8. The method for producing a polyamideimide resin according to claim 6, wherein the polyamideimide resin further has a terminal group blocked with a blocking agent containing at least one selected from the group consisting of an oxime compound and an alcohol.

9. The polyamideimide resin composition according to claim 1, wherein the polyamideimide resin has a number average molecular weight of 17,000 to 20,000.

10. The polyamideimide resin composition according to claim 9, wherein the polyamideimide resin has a degree of dispersion (weight average molecular weight/number average molecular weight) of 2.2 to 2.5, wherein the degree of dispersion is the weight average molecular weight/number average molecular weight.

11. The polyamideimide resin composition according to claim 1, wherein the polyamideimide resin has a degree of dispersion of 2.2 to 2.5, wherein the degree of dispersion is the weight average molecular weight/number average molecular weight.

12. The polyamideimide resin composition according to claim 1, wherein the compound represented by formula (1) comprises 3-methoxy-N,Ndimethylpropionamide.

13. The polyamideimide resin composition according to claim 1, wherein the compound represented by formula (1) comprises 3-butoxy-N,Ndimethylpropionamide.

14. The polyamideimide resin composition according to claim 1, wherein the compound represented by formula (1) is represented by the following formula (1-1):

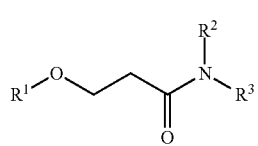
(1-1)

wherein, in the formula, R1 represents an alkyl group of 1 to 8, and R2 and R3 each independently represent a hydrogen atom or an alkyl group of 1 to 8 carbon atoms.

15. The polyamideimide resin composition according to claim 1, wherein a content of the compound represented by formula (1) in the entire solvent is 100 mass %.

16. The polyamideimide resin composition according to claim 1, wherein the solvent consists of the compound represented by formula (1) and optionally the additional solvent at a content of 20 mass % or less.

17. A polyamideimide resin composition comprising a polyamideimide resin and a solvent containing at least one compound selected from the group consisting of 3-methoxy-N, N-dimethylpropionamide and 3-butoxy-N,Ndimethyl-propionamide, wherein a content of the at least one compound in the entire solvent is 100 mass %, wherein the polyamideimide resin has a terminal carboxyl group blocked by reaction with a vinyl ether compound, wherein the polyamideimide resin has a number average molecular weight of 10,000 to 24,000, and wherein the polyamideimide resin has a degree of dispersion of 2.1 to 2.6, wherein the degree of dispersion is the weight average molecular weight/number average molecular weight.

18. The polyamideimide resin composition according to claim 17, wherein the polyamideimide resin has a number average molecular weight of 17,000 to 20,000, and the polyamideimide resin has a degree of dispersion of 2.2 to 2.5, wherein the degree of dispersion is the weight average molecular weight/number average molecular weight.

19. The polyamideimide resin composition according to claim 17, wherein polyamideimide resin composition further comprises an epoxy resin, wherein the polyamideimide resin has a number average molecular weight of 17,000 to 20,000, and wherein the polyamideimide resin has a degree of dispersion of 2.2 to 2.5, wherein the degree of dispersion is the weight average molecular weight/number average molecular weight.

* * * * *